United States Patent
Guthrie et al.

(10) Patent No.: US 8,111,040 B2
(45) Date of Patent: *Feb. 7, 2012

(54) METHOD AND APPARATUS FOR HANDLING A CHARGING STATE IN A MOBILE ELECTRONIC DEVICE

(75) Inventors: Martin G. A. Guthrie, Waterloo (CA); Dusan Veselic, Waterloo (CA); Alexei Skarine, Waterloo (CA); Michael F. Habicher, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/650,245

(22) Filed: Dec. 30, 2009

(65) Prior Publication Data
US 2010/0102774 A1    Apr. 29, 2010

Related U.S. Application Data

(63) Continuation of application No. 11/026,443, filed on Dec. 30, 2004, now Pat. No. 7,663,338.

(60) Provisional application No. 60/545,434, filed on Feb. 17, 2004.

(51) Int. Cl.
*H02J 7/00* (2006.01)
*F21L 4/00* (2006.01)
*H01M 2/10* (2006.01)
*H04N 5/225* (2006.01)

(52) U.S. Cl. .......... 320/107; 320/112; 362/183; 429/96; 348/373

(58) Field of Classification Search .............. 320/107
See application file for complete search history.

(56) References Cited

U.S. PATENT DOCUMENTS

| | | | |
|---|---|---|---|
| 3,748,386 A | | 7/1973 | Monney et al. |
| 4,568,096 A | | 2/1986 | Yew et al. |
| 5,028,859 A | * | 7/1991 | Johnson et al. ............... 320/125 |
| 5,250,891 A | | 10/1993 | Glasgow |
| 5,814,972 A | | 9/1998 | Shimada et al. |
| 5,959,368 A | | 9/1999 | Kubo et al. |

(Continued)

FOREIGN PATENT DOCUMENTS

EP    1198049 A1    4/2002

(Continued)

OTHER PUBLICATIONS

Guthrie, Martin G.A., et al.; U.S. Appl. No. 11/026,590, filed Dec. 30, 2004; Title: Method and Apparatus for Controlling a Charging State in a Mobile Electronic Device.

(Continued)

*Primary Examiner* — Yalkew Fantu
(74) *Attorney, Agent, or Firm* — Conley Rose, P.C.; J. Robert Brown, Jr.

(57) ABSTRACT

In accordance with the teachings described herein, a method and apparatus for handling a charging state in a mobile electronic device is provided. A universal serial bus (USB) interface may be used for connecting the mobile device to a USB host. A processing device may be used to control operation of the mobile device and receive an enumeration acknowledgement signal from the USB host via the USB interface and generate an enable signal upon receiving the enumeration acknowledgement signal. The method and apparatus may further include a rechargeable battery, a battery charger, a timing circuit, and a battery charger enabling circuit.

4 Claims, 5 Drawing Sheets

U.S. PATENT DOCUMENTS

| | | | |
|---|---|---|---|
| 6,031,362 | A | 2/2000 | Bradley |
| 6,144,566 | A | 11/2000 | Keller |
| 6,153,855 | A | 11/2000 | Renner et al. |
| 6,211,647 | B1 | 4/2001 | Wendelrup et al. |
| 6,211,649 | B1 * | 4/2001 | Matsuda ................ 320/115 |
| 6,357,011 | B2 | 3/2002 | Gilbert |
| 6,507,172 | B2 | 1/2003 | Sherman |
| 6,531,845 | B2 * | 3/2003 | Kerai et al. ............ 320/107 |
| 6,531,854 | B2 | 3/2003 | Hwang |
| 6,573,768 | B2 | 6/2003 | Hwang |
| 6,633,932 | B1 | 10/2003 | Bork et al. |
| 6,650,089 | B1 | 11/2003 | Freeman et al. |
| 6,671,814 | B1 | 12/2003 | Kubo et al. |
| 6,774,603 | B2 * | 8/2004 | Liao ..................... 320/107 |
| 6,798,173 | B2 | 9/2004 | Hsu |
| 6,812,971 | B2 * | 11/2004 | Terane .................. 348/375 |
| 6,833,686 | B2 | 12/2004 | Veselic et al. |
| 6,883,715 | B1 | 4/2005 | Fruhauf et al. |
| 6,936,936 | B2 | 8/2005 | Fischer et al. |
| 6,946,817 | B2 | 9/2005 | Fischer et al. |
| 7,170,259 | B2 | 1/2007 | Veselic |
| 7,518,343 | B2 | 4/2009 | Veselic et al. |
| 7,663,338 | B2 * | 2/2010 | Guthrie et al. ......... 320/107 |
| 7,679,316 | B2 | 3/2010 | Guthrie et al. |
| 7,768,239 | B2 | 8/2010 | Veselic et al. |
| 2002/0038432 | A1 * | 3/2002 | Hsu ...................... 713/300 |
| 2002/0154243 | A1 | 10/2002 | Fife et al. |
| 2003/0052547 | A1 * | 3/2003 | Fischer et al. ......... 307/154 |
| 2003/0054703 | A1 * | 3/2003 | Fischer et al. ......... 439/894 |
| 2003/0076138 | A1 | 4/2003 | Hwang |
| 2003/0110403 | A1 | 6/2003 | Crutchfield et al. |
| 2004/0004458 | A1 * | 1/2004 | Tanaka et al. .......... 320/106 |
| 2004/0042138 | A1 | 3/2004 | Saito et al. |
| 2004/0239294 | A1 | 12/2004 | Veselic et al. |
| 2004/0251878 | A1 | 12/2004 | Veselic |
| 2010/0102774 | A1 | 4/2010 | Guthrie et al. |

FOREIGN PATENT DOCUMENTS

| | | |
|---|---|---|
| WO | 9535593 A1 | 12/1995 |
| WO | 0120433 A1 | 3/2001 |

OTHER PUBLICATIONS

European Supplementary Search Report; EP Application No. 04802383.2; Feb. 8, 2010; 5 pgs.

Compaq, et al.; Universal Serial Bus Specification; Revision 1.0; Jan. 15, 1996; 149 pgs. Part 1.

Compaq, et al.; Universal Serial Bus Specification; Revision 1.0; Jan. 15, 1996; 119 pgs. Part 2.

European Communication; EP Application No. 04802384.0; Nov. 18, 2010; 6 pgs.

Supplementary European Search Report; EP Application No. 04802384.0; Aug. 27, 2010; 4 pgs.

Guthrie, Martin G.A.; U.S. Appl. No. 12/689,587; Notice of Allowance mailed Jul. 30, 2010; 16 pgs.

Franc, Fabien; Title: Choosing a Power Supply, Automatically; Electrical Design News888; No. 24; Nov. 23, 2000; 4 pgs.

EPO Communication, EP Application No. 04802384.0; Apr. 14, 2010; 2 pgs.

Veselic, Dusan, et al.; U.S. Appl. No. 12/842,763, filed Jul. 23, 2010; Titled: Method and Apparatus for Handling a Charging State in a Mobile Electronic Device.

Notice of Allowance dated Jul. 30, 2010, U.S. Appl. No. 12/689,587, filed Jan. 19, 2010. (16 pgs.).

Notice of Allowance dated Oct. 7, 2010, U.S. Appl. No. 12/842,763, filed Jul. 23, 2010. (14 pgs.).

Supplemental Notice of Allowability dated Oct. 14, 2010, U.S. Appl. No. 12/689,587, filed Jan. 19, 2010. (7 pgs).

Veselic, Dusan, et al., U.S. Appl. No. 12/842,763, filed Feb. 21, 2011; Titled: Method and Apparatus for Handling a Charging State in a Mobile Electronic Device.

* cited by examiner

METHOD AND APPARATUS FOR HANDLING A CHARGING STATE IN A MOBILE ELECTRONIC DEVICE

CROSS-REFERENCE TO RELATED APPLICATIONS

This continuation application claims priority from U.S. patent application Ser. No. 11/026,443, filed Dec. 30, 2004 by Martin G. A. Guthrie, et al, entitled "Method and Apparatus for Handling a Charging State in a Mobile Electronic Device" (10978-US-PAT1-4214-00704) and U.S. Provisional Application No. 60/545,434, filed Feb. 17, 2004 by Martin G. A. Guthrie, et al, entitled "Method and Apparatus for Handling a Charging State in a Mobile Electronic Device" (10978-US-PRV), which are incorporated by reference herein as if reproduced in their entirety.

BACKGROUND

The present invention relates generally to mobile electronic devices. More particularly, the present invention relates to a method and apparatus for handling a charging state in a mobile electronic device.

Portable systems, such as mobile electronic devices, which are powered by rechargeable batteries have a problem supporting both USB (Universal Serial Bus) charging state and suspend state functions.

When a rechargeable battery is dead or not present, the mobile electronic device can not operate since it does not have any power. In order for the mobile electronic device to operate, the mobile electronic device is connected to a USB host in order to draw power from the host to both power up the device and recharge the battery. However, when the mobile electronic device is connected to the USB host, herein referred to as "VBUS detection, USB specifications require that the device initiate enumeration within 100 msec. Enumeration is the process whereby the device requests permission from the USB host to access the host. In this case, the enumeration request is directed to a request for the mobile electronic device to draw a current/voltage from the USB host in order to power up the mobile electronic device as well as to recharge the dead or non-present battery.

In most cases, it is desired that a battery charger within the mobile electronic device turn on once it receives power from the USB host upon VBUS detection. This causes the battery charger to be enabled so that the current/voltage supplied by the USB host is used for operation of the device and recharging of the battery. This may be referred to as a device charging state. Therefore, when the voltage via the VBUS is applied, the battery charger is enabled and acts as a power source to power up the mobile electronic device and to recharge the battery.

Another common state for the mobile electronic device is a device suspend state. USB specifications require that the total current supplied by the USB host to the mobile electronic device does not exceed 500 µA in the device suspend state. With many mobile electronic devices, 500 µA is not enough current for the processor or CPU in the mobile electronic device to operate and therefore the device is generally powered down. Powering down of the CPU in the mobile electronic device causes all the control signals to default to a low state signal, which causes the battery charger to be enabled. However, since 500 µA is not enough current for operation of the device, it is not desirable for the battery charger to be enabled during the device suspend state. In some other prior art devices, support for the device suspend state is not recognized and the battery charger remains enabled during the device suspend state. In this manner, the 500 µA current limit is not recognized or acknowledged by the mobile electronic device even though it is required by USB specifications.

Furthermore, in some prior art devices, two separate signals to control the device charging state and the device suspend state are used.

It is, therefore, desirable to provide a method and apparatus for handling a charging state and a device suspend state in a mobile electronic device.

SUMMARY

In accordance with the teachings described herein, a method and apparatus for handling a charging state in a mobile electronic device is provided. A universal serial bus (USB) interface may be used for connecting the mobile device to a USB host. A processing device may be used to execute programs and to control operation of the mobile device. The processing device may be operable to receive an enumeration acknowledgement signal from the USB host via the USB interface and generate an enable signal upon receiving the enumeration acknowledgement signal. A rechargeable battery may be used to power the processing device. A battery charger may be used to receive a USB bus voltage from the USB interface and use the USB bus voltage to power the processing device and to charge the rechargeable battery. The battery charger may be further operable to receive a charge enable signal that enables and disables the battery charger from powering the processing device and charging the rechargeable battery. A timing circuit may be used to detect the USB bus voltage and to measure the passage of a pre-determined amount of time upon detecting the USB bus voltage. A battery charger enabling circuit may be used to generate the charge enable signal to control the battery charger, the battery charger enabling the battery charger if the timer has measured the passage of the pre-determined amount of time or the enable signal is received from the processing device.

BRIEF DESCRIPTION OF THE DRAWINGS

Embodiments of the present invention will now be described, by way of example only, with reference to the attached Figures, wherein.

DETAILED DESCRIPTION

Figure 1:
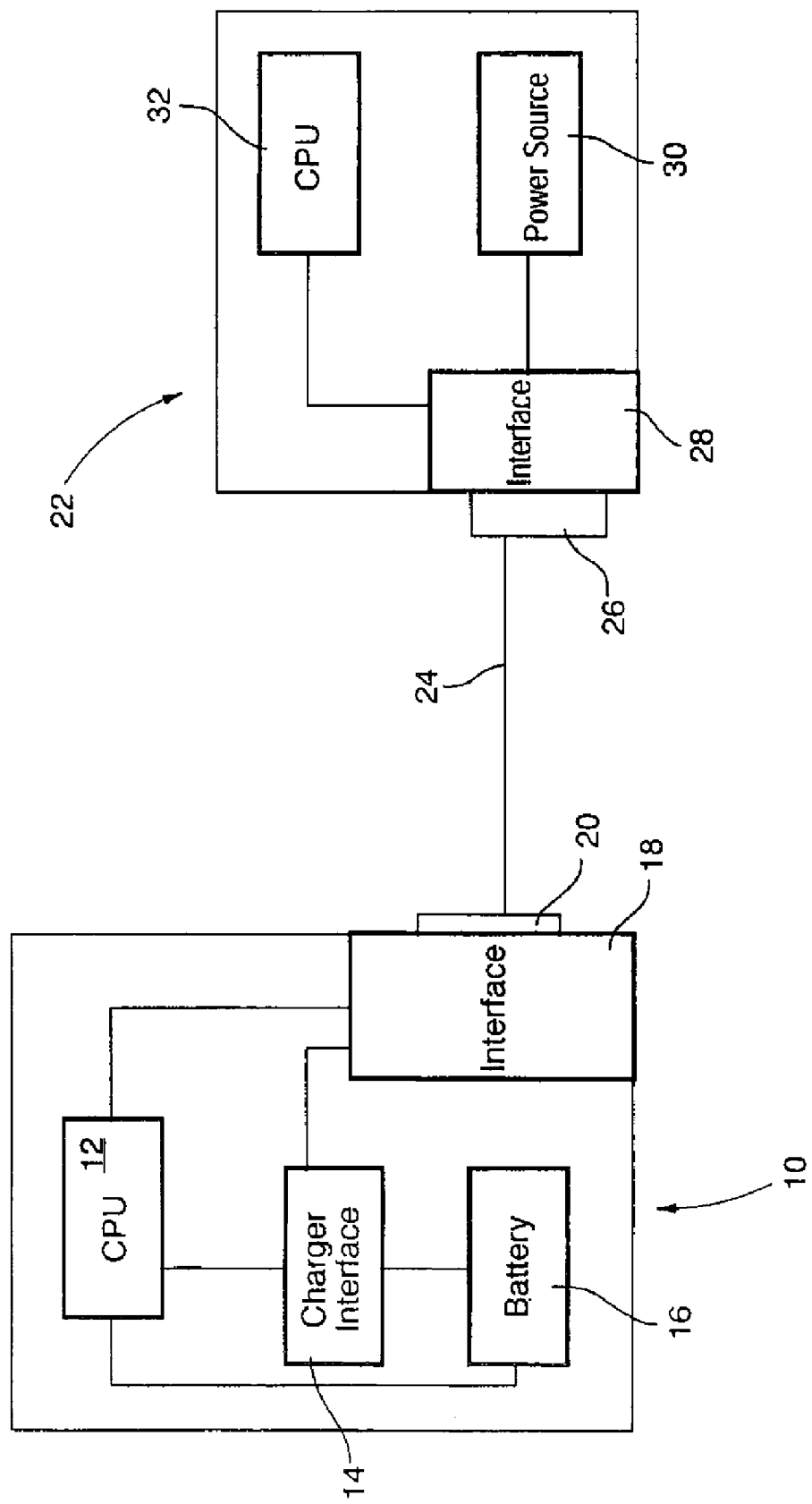
FIG. 1 is a schematic diagram of a mobile electronic device connected to a Universal Serial Bus (USB) host.

FIG. 1 is a schematic diagram of a mobile electronic device 10 connected to a Universal Serial Bus (USB) host 22. The mobile electronic device 10 includes a central processing unit (CPU) 12 that is coupled to a charger interface 14 which, in turn, is coupled to a rechargeable battery 16. The CPU 12 is also connected to the rechargeable battery 16 and to a USB interface 18 which is connected to a USB port 20. In addition, the charger interface 14 is connected to the USB interface 18.

The USB interface 18 interacts with the USB port 20 to receive data and power from and transmit data to the USB host 22.

During operation of the mobile electronic device 10, when a user determines that the rechargeable battery 16 is dead or not present, the user connects the mobile electronic device 10 to the USB host 22 via a USB cable 24. Within the USB cable 24 are four separate circuit lines: a power line, a ground line and two data lines. At the USB host 22, the USB cable 24 is connected to a USB host port 26. A device interface 28 is connected to the USB host port 26 for transmitting data and power to and receiving data from the mobile electronic device 10. The USB host 22 further includes a power source 30 and a USB host CPU 32 which are both connected to the device interface 28. The power source 30 provides the requested power, in the form of a current/voltage, to the mobile electronic device while the USB host CPU 32 acknowledges enumeration and transmits a device suspend state request or signal, when required.

Figure 2A:
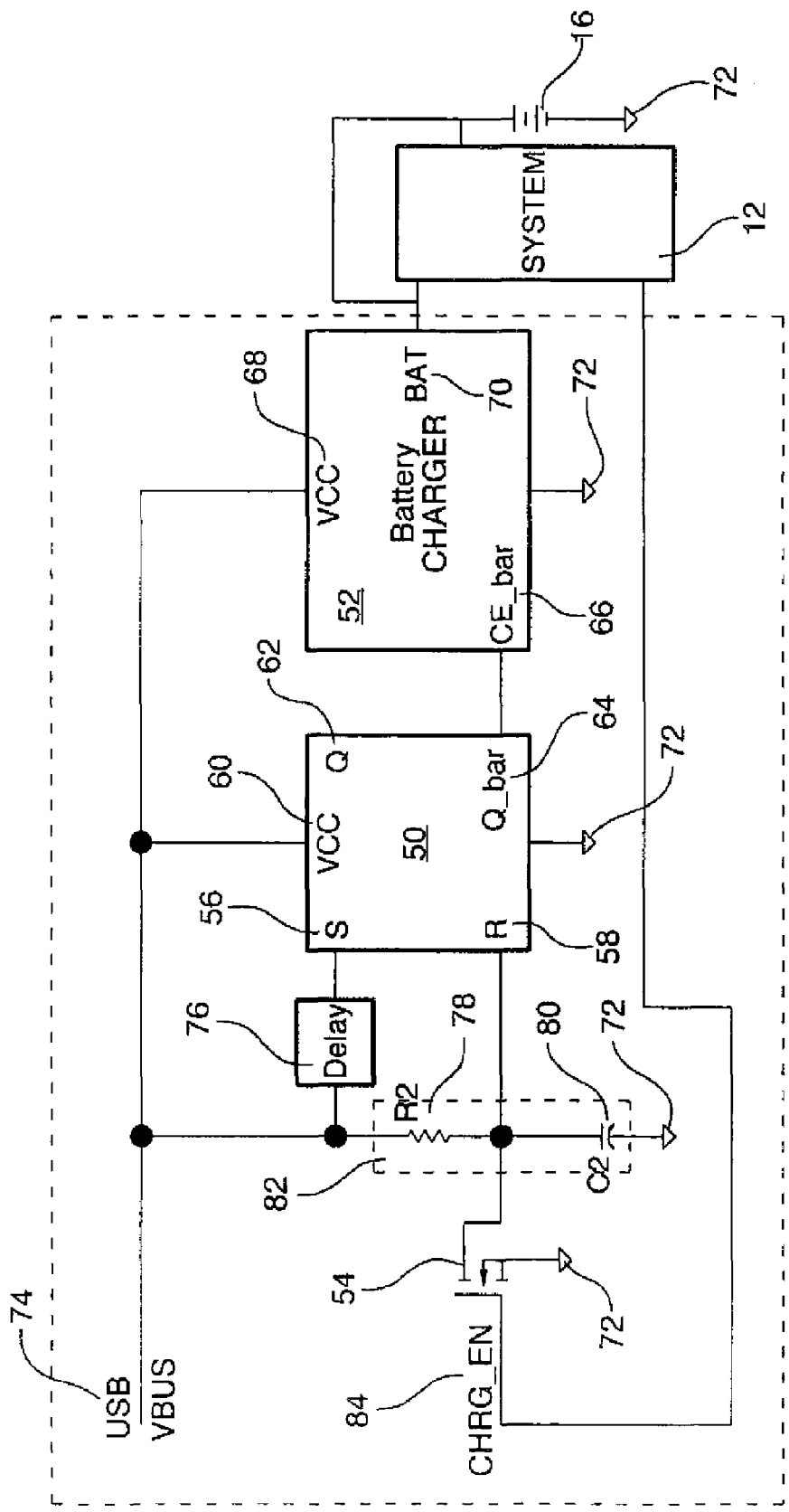
FIG. 2a is a schematic diagram of apparatus for handling a device charging state for a mobile electronic device.

Turning to FIG. 2a, a schematic diagram of apparatus for handling a charging state and/or a device suspend state in a mobile electronic device is shown. The apparatus may, for example, be implemented within the charger interface 14 of FIG. 1, and includes a battery charger enabling circuit 50, a battery charger 52 and an inverting circuit 54. In this example, the battery charger enabling circuit is a RS flip flop 50 and the inverting circuit is a field effect transistor (FET) 54. The RS flip flop 50 includes an S port 56, an R port 58, a Vcc port 60, a Q port 62 and a Q_bar port 64. The battery charger 52 includes a CE_bar port 66 (connected to the Q_bar port 64), a Vcc port 68 and a BAT port 70. Both the RS flip flop 50 and the battery charger 52 are connected to ground 72. A USB VBUS input 74 is connected to the S port 56 via a delay 76 and the Vcc ports 60 and 68 of the RS flip flop 50 and the battery charger 52, respectively.

In the illustrated example, the delay 76 is implemented with a resistor-capacitor (RC) circuit, but may also be a voltage detector with a pre-set delay, or some other type of delay circuit. The delay 76 may, for example, be preset for 1 to 5 ms.

The VBUS input 74 is also connected to the R port 58 of the RS flip flop 50 via a resistor 78 and to ground 72 via the resistor 78 and a capacitor 80. The values of the resistor 78 and the capacitor 80 may be selected so that they form a 100 ms timer 82, in accordance with the time allotted by the USB specifications for drawing power from a USB host without receiving an enumeration acknowledgement signal from the USB host. This timer represents the time period within which an acknowledgement of enumeration is expected from the USB host CPU 32 by the system 12.

The BAT port 70 of the battery charger 52 is connected to the CPU 12 and the rechargeable battery 16 to provide the necessary current/voltage from the VBUS input for both powering the mobile electronic device 10 and for recharging the battery 16. In the case the battery is not present, there is only current/voltage transmitted to the CPU 12.

An output 84 from the CPU 12 is connected to the R port 58 of the RS flip flop 50 via the FET 54. The output 84 is generally a signal which allows the system to enable or disable the battery charger 52 and to switch between the device charging state and the device suspend state.

Figure 2B:
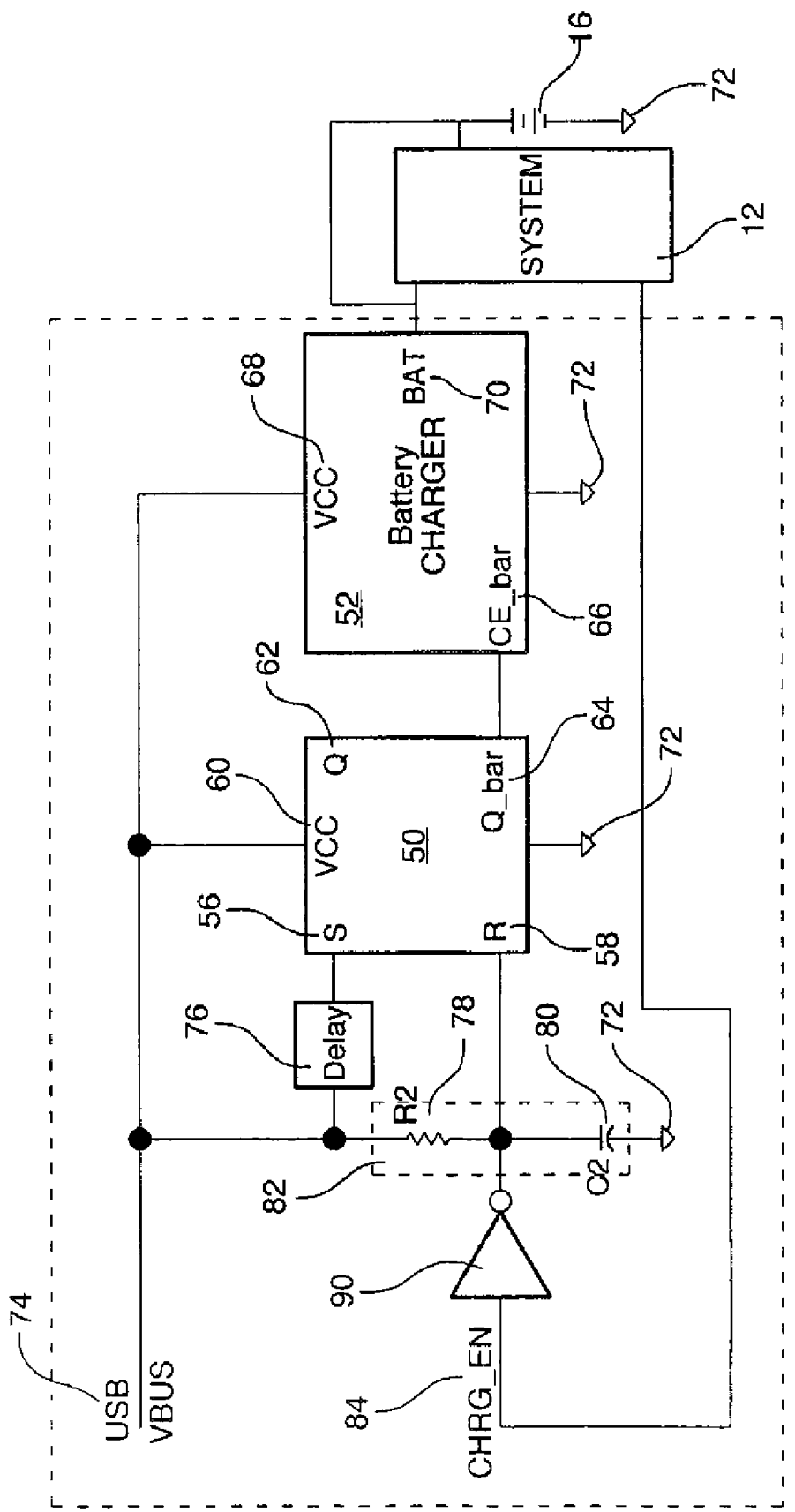
FIG. 2b is a schematic diagram of a second embodiment of apparatus for handling a device charging state for a mobile electronic device.

FIG. 2b is a block diagram of a second example apparatus for handling the charging state/device suspend state in a mobile electronic device. This example is similar to the example shown in FIG. 2a, except that the inverting circuit is an inverter logic gate 90.

Figure 2C:
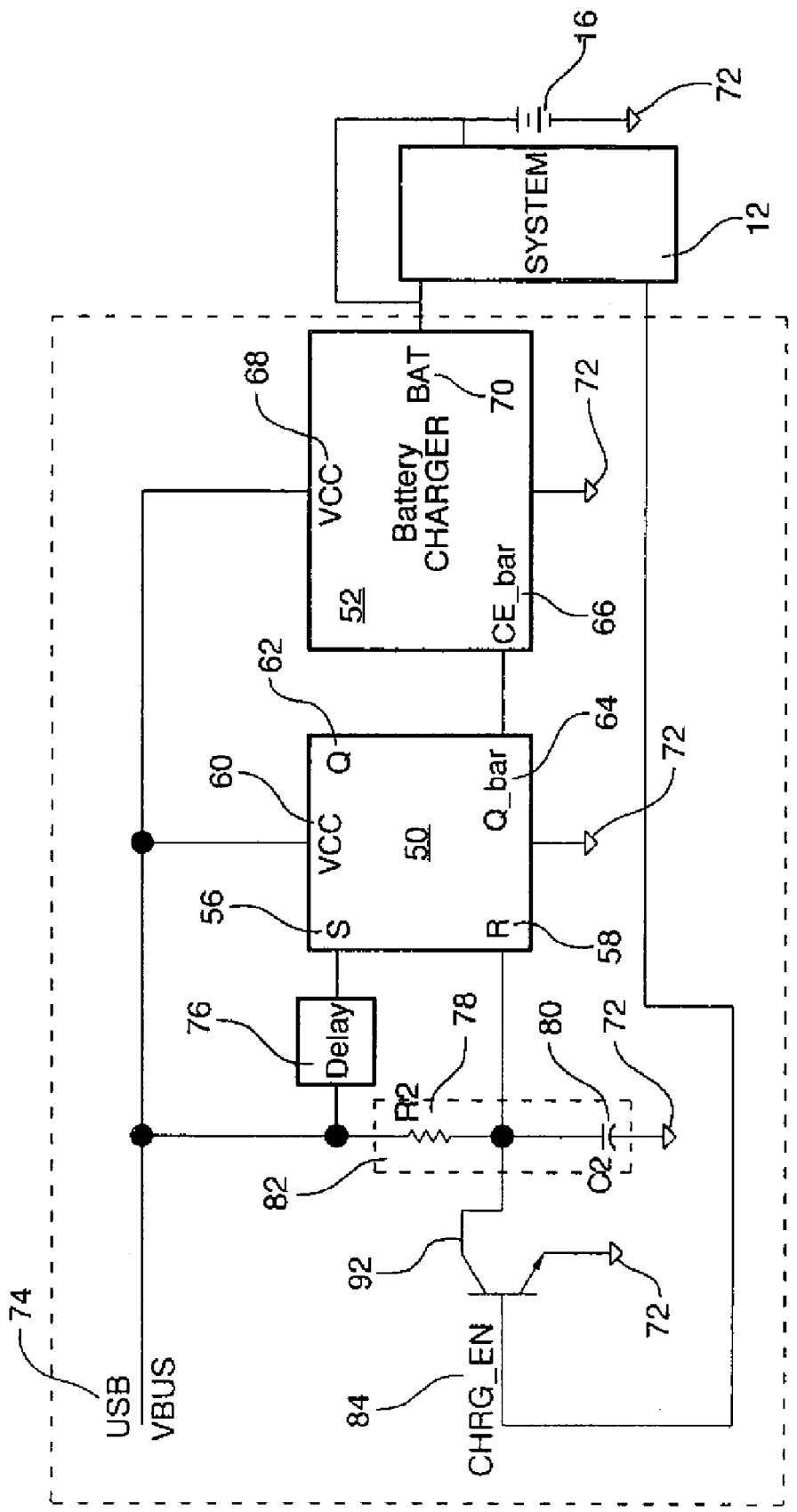
FIG. 2c is a schematic diagram of a third embodiment of apparatus for handling a device charging state for a mobile electronic device.

FIG. 2c is a block diagram of a third example apparatus for handling the charging state and/or device suspend state in a mobile electronic device. This example is similar to the examples of FIGS. 2a and 2c, except that the inverting circuit is a bipolar transistor 92.

Figure 3:
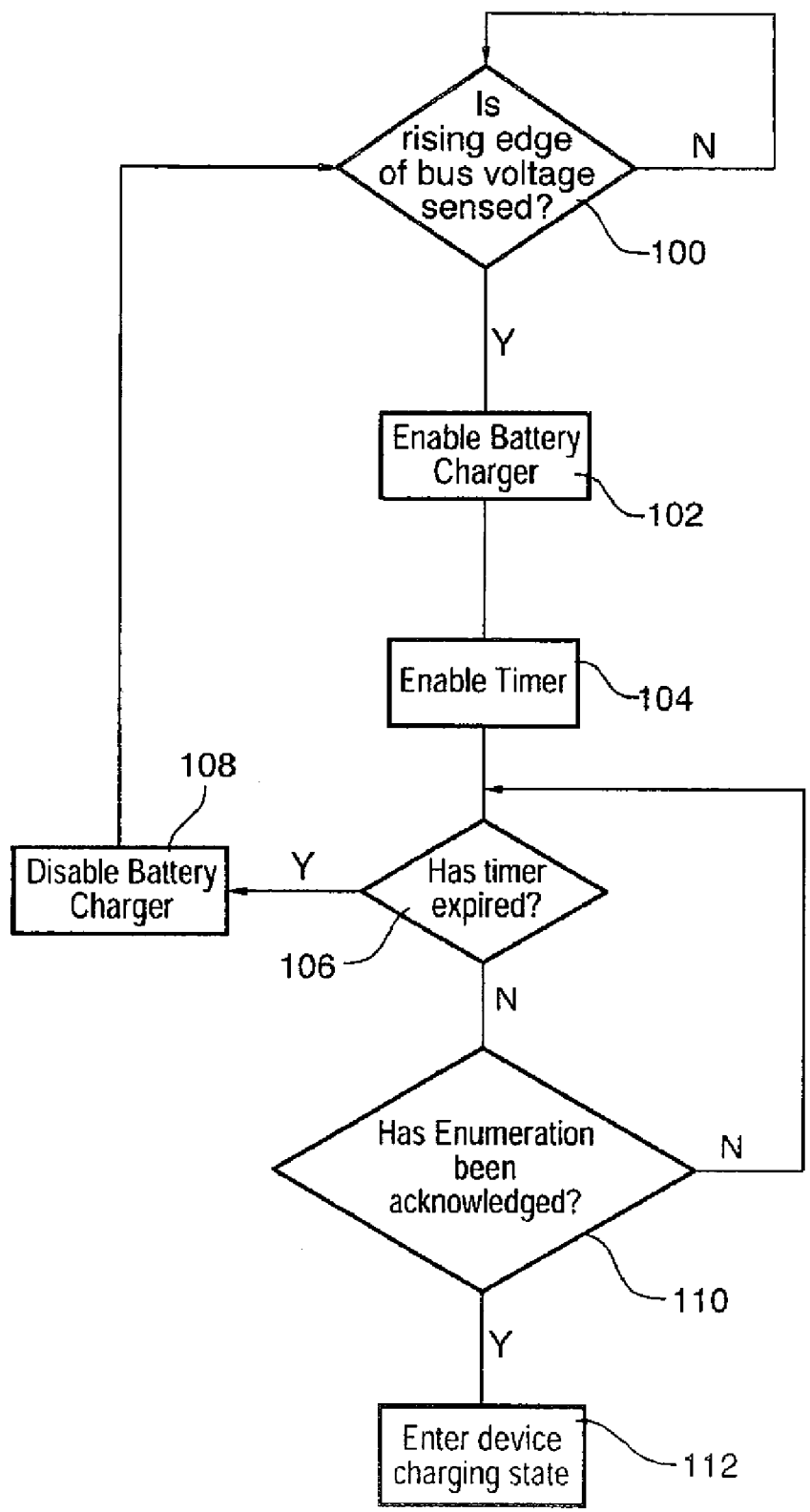
FIG. 3 is a flow diagram outlining a method of handling a device charging state for a mobile electronic device.

Turning to FIG. 3, a flow diagram showing an example method of handling a device charging state in a mobile electronic device is shown. In order to determine if the mobile electronic device has entered the device charging state, a check is performed to sense if inputs to the charger interface 14 are in a low state. When the inputs are in a low state, the indication is that there is no power being transferred to the CPU 12 indicating that the battery 16 is dead or not present. The output 84 from the CPU 12 is transmitted as a low state signal and there is no voltage at the input 74.

After sensing that the inputs to the charger interface 14 are at a low state, the rising edge of the VBUS input 74 (supplied by the power source 30 in the USB host 22) is sensed (step 100) by the Vcc port 60 of the RS flip flop 50. This step is repeated until the rising edge of the VBUS input 74 is sensed (e.g., when the USB cable is connected between the mobile electronic device 10 and the USB host 22.)

Once the USB cable 24 is connected between the mobile electronic device 10 and the USB host 22, power from the USB VBUS input 74, in the form of a current/voltage, is transmitted from the power source 30 via the USB cable 24 to the mobile electronic device 10. When the power is applied at the input 74, the VBUS input 74 input may be seen as a high state signal.

Once applied, the input 74 is sensed by the Vcc port 60 of the RS flip flop 50 which causes the RS flip flop 50 to be initially powered. The USB VBUS input 74 also transmits the high signal to the S port 56 of the RS flip flop 50 after passing through the delay 76. The delay allows the RS flip flop 50 to be enabled by the input 74 without interruption by inputs at the S or R port 56 and 58. The high state signal received by the port 56 causes the Q_bar port 64 to transmit a low state signal to the CE_bar port 66 enabling the battery charger 70 (step 102). The battery charger 70 then transmits power, in the form of a current, via the BAT port 70 to the system to power up the mobile electronic device 10 and to the battery 16 to recharge the battery.

Once the CPU 12 receives this current, the CPU 12 responds to an enumeration request from the USB host CPU 32 via the data lines in the USB cable 24.

While the battery charger 52 is being enabled, the timer 82 is also enabled (step 104) by the VBUS input 74. The timer 82 is set to a pre-determined time period (determined by the selection of the resistor and capacitor values), such as 100 ms. A check is then performed to verify that the timer 82 has not expired (step 106).

When the VBUS input 74 is transmitted from the power source 30 to the mobile electronic device 10, the capacitor 80 charges due to the capacitor being in the series with the resistor 78. The value of the resistor 78 and the capacitor 80 in the timer 82 are selected so that the capacitor becomes charged (reaches a high state threshold) after the predetermined time period (e.g., 100 ms.)

If the timer 82 has expired (i.e. has not been disabled before the period of 100 ms has elapsed), the high state threshold from the voltage on the capacitor causes the input at the R port 58 to be high which, in turn causes the Q_bar port 64 to transmit a high signal to the CE_bar port 66 to disable the battery charger 52 (step 108). This performs the function of a watchdog timer which verifies that enumeration between the system and the USB host has been acknowledged during the predetermined time period. The device then returns to the step of sensing the rising edge of the VBUS input (step 100).

If the timer 82 has not expired, whereby the high state threshold on port R 58 has not been met, a check is performed to determine if enumeration between the system 12 and the USB host CPU 30 has been acknowledged (step 110). That is, a check is performed to verify whether or not the CPU 12 has received acknowledgement from the USB host to draw current from the power source 30. If enumeration has not been acknowledged, verification that the timer has not elapsed is once again performed (step 106).

If the enumeration request has been acknowledged, the system (e.g., CPU) 12 transmits a high state signal 84 to the inverting means, seen as the FET 54 in the preferred embodiment, which then sends a low state signal to the R port 58 of the RS flip flop 50 causing the battery charger 52 to remain enabled and the mobile electronic device 10 to enter the device charging state (step 112). This output 84 also overrides the charging of the capacitor 80 by short circuiting the capacitor so that the battery charger 52 is not erroneously disabled after the predetermined time period.

When the system (e.g., CPU) 12 of the mobile electronic device receives a suspend state request from the CPU 32 in the USB host 22, the output 84 from the system (e.g., CPU) 12 is driven to a low state signal which turns off FET 54 allowing resistor 78 to charge capacitor 80, both inside timer circuit 82. When capacitor 80 reaches the high state threshold of port R 58, this causes the RS flip-flop to reset and transmit a high state signal from the Q_bar port 64 to the CE_bar port 66 disabling the battery charger 52. Since the battery charger 52 is providing power to the system 12 when the battery 16 is dead or not present, the system (e.g., CPU) 12 is powered down and the VBUS current from the VBUS input drops below 500 μA as required by USB suspend state specifications.

This written description uses examples to disclose the invention, including the best mode, and also to enable a person skilled in the art to make and use the invention. The patentable scope of the invention may include other examples that occur to those skilled in the art.

What is claimed is:

1. A method for powering a mobile device and charging a battery in the mobile device comprising: detecting a universal serial bus (USB) bus voltage at a USB interface configured to be connectable to a USB host; measuring passage of a pre-determined amount of time, the pre-determined amount of time starting upon the detecting of the USB bus voltage; allowing the powering of one of the mobile device, the charging of the rechargeable battery, or, both the mobile device and the charging of the rechargeable battery during the pre-determined amount of time; detecting receipt of a device suspend signal during the pre-determined amount of time, and then disabling the use of the USB bus voltage and a current to power the mobile device and charge the battery; and if an enumeration is not completed before the pre-determined amount of time has expired, then disabling the use of the USB bus voltage and the current to power the mobile device and charge the battery; wherein the USB cable is connected between mobile electronic device and the USB host to transmit current and voltage from the USB port.

2. The method of claim 1, wherein the pre-determined amount of time is an amount of time specified by the USB specifications during which the mobile device may be powered using the USB bus voltage without completing enumeration.

3. The method of claim 1, wherein the pre-determined amount of time is less than or equal to 100 msec.

4. The method of claim 1, further comprising:
receiving a device suspend state request via the USB interface and generating a disable signal upon receiving the device suspend state request, enabling the device to disable the battery charger.

* * * * *